(12) United States Patent
Sano

(10) Patent No.: US 6,587,045 B2
(45) Date of Patent: Jul. 1, 2003

(54) WINKER LEVER CANCELING APPARATUS

(75) Inventor: Yukiharu Sano, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/975,958

(22) Filed: Oct. 15, 2001

(65) Prior Publication Data

US 2002/0056629 A1 May 16, 2002

(30) Foreign Application Priority Data

Oct. 13, 2000 (JP) ........................................ 2000-313735

(51) Int. Cl.⁷ ................................................. B60Q 1/40
(52) U.S. Cl. ..................... 340/476; 340/475; 200/61.27
(58) Field of Search ................. 340/475, 476; 200/61.27, 61.3, 61.38, 61.39

(56) References Cited

U.S. PATENT DOCUMENTS

| | | | | |
|---|---|---|---|---|
| 4,315,117 A | * | 2/1982 | Kokubu et al. ........... 200/61.27 |
| 4,633,214 A | * | 12/1986 | Miyata et al. ................. 340/73 |
| 4,638,290 A | * | 1/1987 | Wagner ........................ 340/56 |
| 4,644,318 A | * | 2/1987 | Miyamaru et al. ............. 340/73 |
| 4,658,236 A | * | 4/1987 | Oka et al. ...................... 340/56 |
| 4,792,785 A | * | 12/1988 | Miyamaru Yukio et al. .. 340/73 |
| 4,902,860 A | | 2/1990 | Maeda ..................... 200/61.27 |
| 4,939,540 A | | 7/1990 | Kamada et al. ............. 335/190 |
| 5,068,633 A | | 11/1991 | Maeda ........................ 335/190 |
| 5,260,685 A | * | 11/1993 | Parker ........................ 340/477 |
| 6,020,813 A | * | 2/2000 | Harris et al. ................. 340/465 |
| 6,465,751 B2 | * | 10/2002 | Papenfuss et al. .......... 200/61.3 |

FOREIGN PATENT DOCUMENTS

| | | | | |
|---|---|---|---|---|
| JP | Sho.60-0081345 | 1/1985 | ............ B60Q/1/42 |
| JP | Hei.1-161956 | 11/1989 | ............ B60Q/1/40 |
| JP | Hei.3-44042 | 4/1991 | ............ B60Q/1/40 |
| JP | Hei.10-223098 | 8/1998 | .......... H01H/25/04 |

* cited by examiner

Primary Examiner—Daniel J. Wu
Assistant Examiner—Phung T Nguyen
(74) Attorney, Agent, or Firm—Sughrue Mion, PLLC

(57) ABSTRACT

The position of an operated winker lever (104) is held by a moderation pin (108) and a moderation ridge portion (151). Further, a position detection means detects a position at which the winker lever (104) is held. Moreover, a projection portion (121) and a guide portion, which respectively interlock with an operating plate (131) of a solenoid (103) and a winker lever (104), are engaged with each other. Thus, as the magnetized operating plate (131) moves, the winker lever (104) is returned to a neutral position.

4 Claims, 7 Drawing Sheets

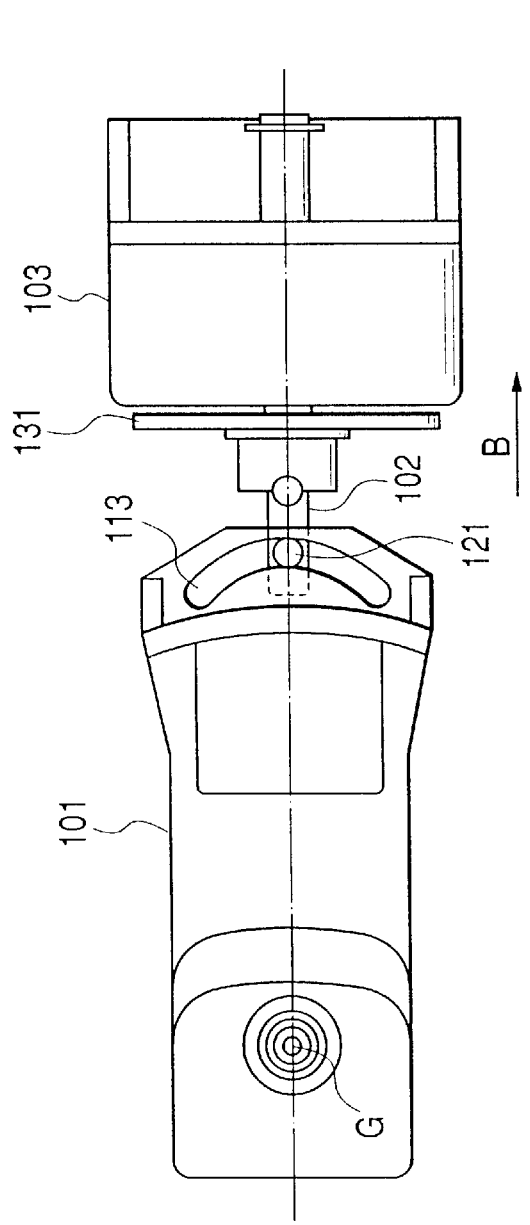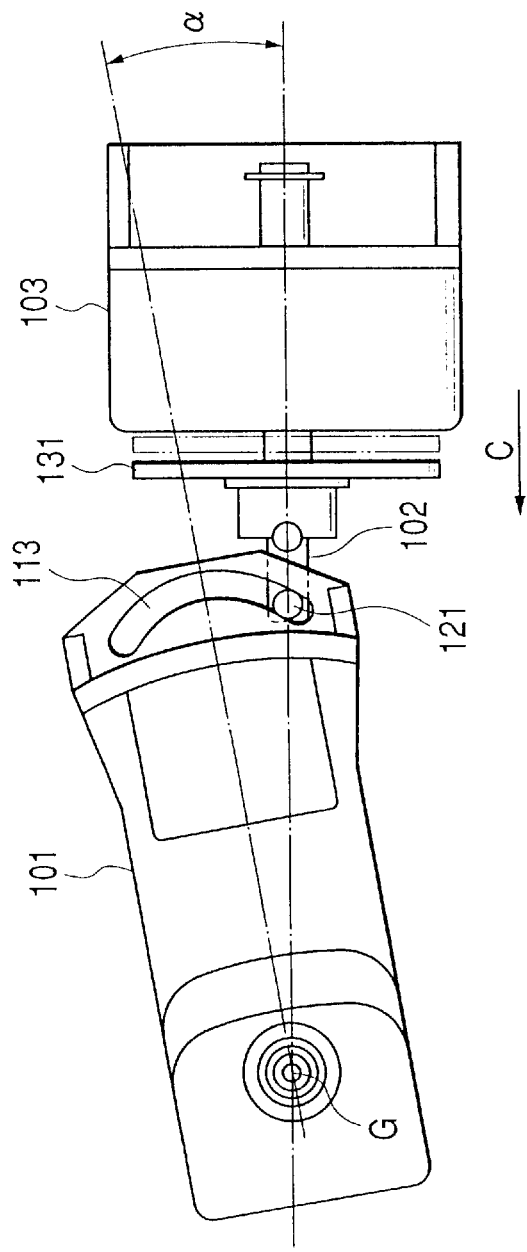
FIG. 6A
FIG. 6B

WINKER LEVER CANCELING APPARATUS

BACKGROUND OF THE INVENTION

The present invention relates to a canceling apparatus for a winker lever of an automobile.

Most of related winker lever operation cancellation apparatus of such a kind each include a cancel cam. Such related canceling apparatus for a winker lever have encountered the problem that the position-shift and eccentricity of this cancel cam cause errors in performing a turn canceling operation of a winker lever. This problem is described hereinafter with reference to the accompanying drawings.

FIGS. 7A and 7B are views each illustrating an operation of the related canceling apparatus for a winker lever. These figures are drawn by supposing that the related winker lever cancellation apparatus is seen from above in a state in which an under cover is removed therefrom. FIG. 7A shows a neutral (or turned-off) state of this winker lever, while FIG. 7B shows a turned-on state thereof.

This related canceling apparatus for a winker lever is adapted so that a winker lever operation is performed so as to cause a right winker to blink, and that a winker lever is mechanically returned to a neutral position in response to a predetermined steering operation. This related apparatus is comprises a spindle portion 901, a back plate 902, a cancel pin 903, a spring 904, and a cancel cam 905. Incidentally, reference numeral 900 designates an under cover. Further, an outer casing of this related apparatus is constructed by attaching an upper cover (not shown in these figure) to this under cover 900.

For example, in case of designating aright turn in a neutral state, a lever 906 is turned in a direction of an arrow D shown in FIG. 7A and then the cancel pin 903 projects in the direction of an arrow E shown in FIG. 7B. Incidentally, the right winker blinks according to the turn of the lever 906. In case of designating a left turn, the lever 906 turns in a direction opposite to the aforementioned direction of the turn thereof. Further, the apparatus performs a similar operation. Thus, a left winker blinks.

In a state as illustrated in FIG. 7B, when the cancel cam 905 interlocking with a steering is counterclockwise turned as indicated by an arrow F, an end part 952 of a fan-like portion 951 of the cancel cam 905 abuts against a side wall 931 of the cancel pin 903. Then, when the steering is turned still more, the cancel pin 903 is turned around a rotation center shaft 933 so that an abutting portion thereof which abuts against the back plate 902 is pushed in the direction of an arrow H in this figure. Consequently, the winker lever 906 returns to a neutral state as illustrated in FIG. 7A. Thus, a turn canceling operation of the winker lever is performed.

However, in the case of such a related canceling apparatus for a winker lever, as described above, an error occurs in performing a turn canceling operation of a winker lever. This problem is described hereinafter with reference to FIGS. 8A and 8B.

FIGS. 8A and 8B are views for comparing a normal condition operation of a related canceling apparatus for a winker lever with an abnormal condition operation thereof. Particularly, FIG. 8A illustrates an operation to be performed in the normal condition of the related canceling apparatus f or a winker lever. FIG. 8B illustrates an operation to be performed in the abnormal condition thereof. The problem is described hereinafter by comparing theses figures with each other. Incidentally, in FIGS. 8A and 8B, only necessary ones of constituent elements are selected and described for brevity of description. Further, in FIGS. 8A and 8B, like reference numerals designate like constituent elements shown in FIG. 7.

As shown in FIG. 8A, the lap amount L1 between the cancel pin 903 and the cancel cam 905 is 3.0 mm when the apparatus is in a turned-on state under a normal condition. In this state, when the cancel cam 905 turns in a clockwise direction in response to a steering operation as indicated by an arrow X, the cancel pin 903 turns around a rotation center shaft 933 in a direction designated by reference character Y. Furthermore, as the steering rotates, the rotation of the cancel pin 903 is finally controlled as indicated by one-dot chain lines. As the cancel pin 903 performs the turn, the abutting portion of the cancel pin 903 is pushed as described above. Consequently, the winker lever 906 connected to the back plate 902 is returned to the neutral state. A rotation angle β1 of the canceling pin 903 under this normal condition is 41.2 degrees, as shown in this figure.

However, when the position shift or the eccentricity Z of the cancel cam 905 occurs as illustrated in FIG. 8B, the lap amount between the cancel pin 903 and the cancel cam 905 decreases. For example, when the lap amount L2 decreases to 2.0 mm, the rotation range β2 of the cancel pin 903 decreases to 35.8 degrees. Further, when both the outside dimensions of the cancel cam 905 and the length of the cancel pin 903 vary to small values, the lap amount decreases still more and the rotation range of the cancel pin 903 decreases still more. For instance, when the lap amount L3 decreases to 1.0 mm, the rotation range β3 of the cancel pin 903 decreases to 29.2 degrees.

As described above, the turning operation of the winker lever connected to the back plate 902 is canceled by a thrust pressure of the back plate 902, which is caused by rotation of the cancel pin 903. Thus, when the rotation range of the cancel pin 903 decreases as described above, an error occurs in performing a turn canceling operation of the winker lever.

SUMMARY OF THE INVENTION

Accordingly, in view of the aforementioned present circumstances, an object of the invention is to provide a canceling apparatus for a winker lever, which is enabled to prevent an occurrence of an error in performing a turn canceling operation of a winker lever.

In order to solve the aforesaid object, the invention is characterized by having the following arrangement.

(1) A winker lever canceling apparatus includes:
   an outer casing having an upper cover and an under cover;
   a winker lever turnably held in the outer casing;
   a solenoid for returning the winker lever to a neutral portion, which is excited according to a rotation angle signal outputted from an angle sensor and representing a steering angle of a steering and includes an operating plate;
   a moderation pin elastically provided on the winker lever through a moderation spring;
   a moderation ridge portion integrally formed in the outer casing and engaged with the moderation pin for holding the winker lever in one of neutral, left and right positions;
   a position detection portion formed in the outer casing for detecting the position where the winker lever is held;
   a projection portion which interlocks with the operating plate; and
   a guide portion engaged with the projection portion and provided so as to interlock with the winker lever to return the winker lever to the neutral position according to movement of the operating plate.

According to the first aspect of the invention, the position of the operated winker lever is held by the moderation pin and the moderation ridge portion. Further, the position detection portion detects which of the positions is a position in which the winker lever is held. Moreover, the projection portion and the guide portion, which respectively interlock with the operating plate of the solenoid and the winker lever, are engaged with each other. Thus, the winker lever is returned to the neutral position as the excited operating plate moves.

(2) The winker lever canceling apparatus according to (1), wherein the position detection portion includes:
   a moving contact provided on an electric board accommodated in the outer casing; and
   a contact slider which interlocks with the winker lever and slides while being in contact with the moving contact.

According to the second aspect of the invention, the position detection portion comprises the moving contact and the contact slider. Thus, the contact slider interlocks with the winker lever and slides while the slider is in contact with the moving contact. Thus, the position of the winker lever is reliably detected in response to the operation of the winker lever.

(3) The winker lever canceling apparatus according to (1), wherein the guide portion is constituted by an arcuate groove having a predetermined width.

According to the third aspect of the invention, the guide portion is constituted by an arcuate groove having a predetermined width. Thus, the projection portion smoothly and reliably slides on this groove. The projection portion interlocks with the operating plate of the solenoid, while the groove interlocks with the winker lever. Consequently, a turn canceling operation of the winker lever is reliably achieved.

(4) The winker lever canceling apparatus according to (1), wherein
   the angle sensor includes a disk having slits and a photointerrupter, and phototransistor, and
   the slits and the photointerrupter interrupt light from beyond the dist to turn on or off the phototransistor and the angle sensor detects the rotation angle signal of the steering.

According to the fourth aspect of the invention, the angle sensor detects the rotation angle by turning on or off the phototransistor. Thus, the angle sensor of a simple structure reliably detects the rotation angle. That is, basically, the angle sensor is simply constructed only by the photointerrupter 54 and the phototransistor. Moreover, there is no electrical contact between the disk and the photointerrupter. Thus, an electrical contact failure due to electrical contact wear does not occur. Consequently, the rotation angle is reliably detected in a long term.

BRIEF DESCRIPTION OF THE DRAWINGS

FIGS. 6A and 6B are views illustrating operations performed between the spindle portion and the operating plate of the solenoid, which are shown in FIG. 3.

DETAILED DESCRIPTION OF PREFERRED EMBODIMENT

Hereinafter, an embodiment of the invention is described with reference to the accompanying drawings.

Figure 1:
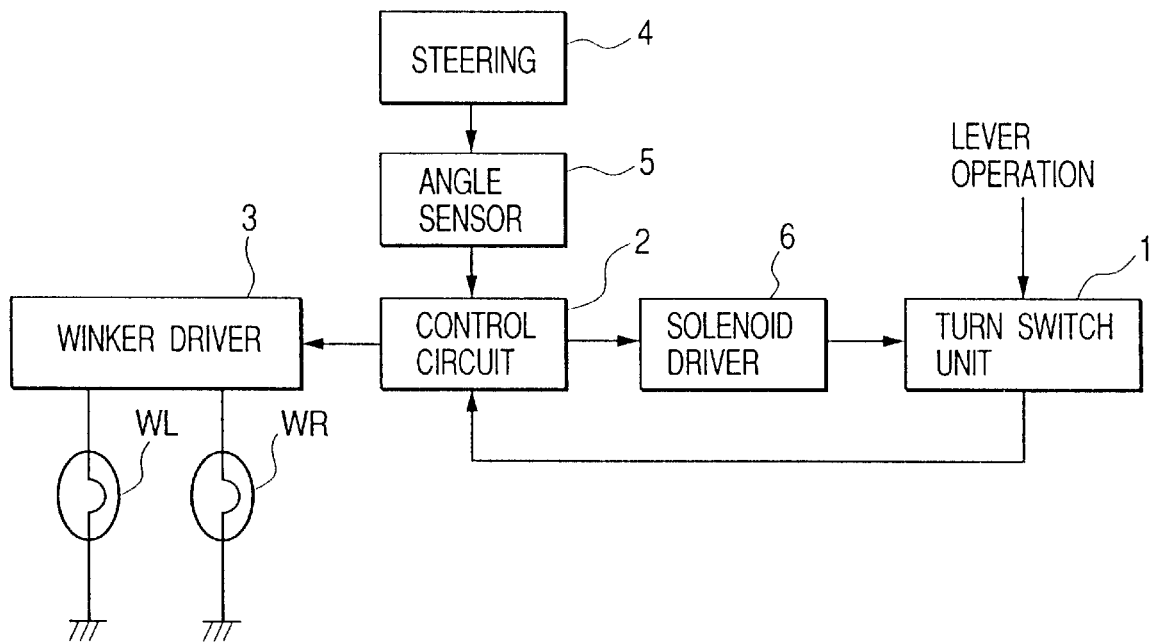
FIG. 1 is a block view illustrating an example of a canceling apparatus for a winker lever, which embodies the invention.

FIG. 1 is a block view illustrating an example of a canceling apparatus for a winker lever, which embodies the invention. This example is assumed to be a canceling apparatus for a winker lever of an automobile.

As shown in FIG. 1, a turn switch unit 1 supplies aright-turn indication signal or a left-turn indication signal to a control circuit 2 in response to a winker lever operation, that is, a lever operation for indicating a right turn or a left turn by using a winker. Further, in response to the lever operation, the turn switch unit 1 causes an operating plate of a solenoid incorporated in the unit to move.

The control circuit 2 controls a winker driver 3 in response to this right-turn or left-turn indication signal so as to cause a right winker or a left winker to blink. The winker driver 3 supplies a blinking signal, whose frequency is 60 to 120 Hz, to the right winker WR or the left winker WL under the control of a well-known intermittent switching device including a flasher relay.

On the other hand, an angle sensor 5 detects a rotation angle of a steering 4 and then generates pulses according to the detected rotation angle. Further, the angle sensor 5 supplies the pulses to the control circuit 2. This angle sensor 5 is obtained by utilizing a photointerrupter, and described later with reference to FIG. 2.

The control circuit 2 performs arithmetic processing on the pulses outputted from the angle sensor 5 and calculates a rotation angle of the steering 4. When the rotation angle of the steering 4 meets predetermined conditions, for example, when the steering 4 is counterclockwise (or clockwise) turned by an angle of 20 degrees after clockwise (or counterclockwise) turned more than an angle of 70 degrees, a solenoid driver 6 is activated to return the winker lever to the neutral position. This solenoid driver 6 comprises, for instance, a solenoid relay.

When the solenoid is controlled and driven by the solenoid driver 6, the solenoid attracts the operating plate moved in response to the lever operation, as described above. As this attracting operation is performed, the solenoid returns the winker lever to the neutral position.

Figure 2:
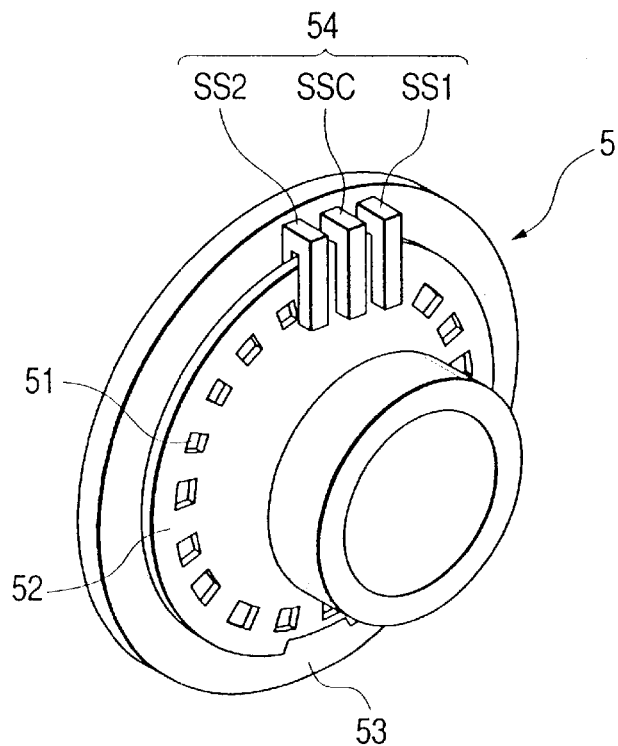
FIG. 2 is a perspective view illustrating an example of an angle sensor for use in the canceling apparatus for a winker lever, which embodies the invention.

FIG. 2 is a perspective view illustrating an example of an angle sensor for use in the canceling apparatus for a winker lever of this embodiment shown in FIG. 1.

The angle sensor 5 shown in FIG. 2 is mounted in a combination switch portion of the automobile and operative to detect the steering amount and direction of the steering, that is, the rotation angle thereof. The angle sensor 5 has a disk 52 adapted to rotate as the steering operation is performed. A plurality of slits 51 and a cutout portion 53 are provided in this disk 52.

Moreover, this angle sensor 5 has three sets of photointerrupters 54 (SS1, SS2, and SSC). A phototransistor thereof is turned on or off by interrupting light by the use of the slits 51 and the cutout portion 53 provided in the disk 52. Thus, the rotation angle is detected. That is, a result of turning on or off the phototransistor is obtained by using the slits 51, the cutout 53 and the three sets of photointerrupters SS1, SS2 and SSC, and a three-phase voltage waveform is obtained from the result. Then a signal having this voltage waveform is outputted as a rotation angle signal representing a steering angle.

The angle sensor 5 is adapted to detect the rotation angle by turning on or off the photo transistor. Thus, the angle sensor 5 has a simple structure reliably and is able to detect a rotation angle. That is, the angle sensor 5 is constructed only by comprising the photointerrupter 54 and the phototransistor in addition to the disk 52, which interlocks with the steering 4, in such a manner as to have a simple structure. Further, there is no electrical contact between the disk 52 and the photointerrupter 54. Thus, an electrical contact failure due to electrical contact wear does not occur. Consequently, the rotation angle is reliably detected in a long term.

Next, the canceling apparatus for a winker lever according to this embodiment is described hereinafter by referring to FIGS. 3 and 4.

Figure 3:
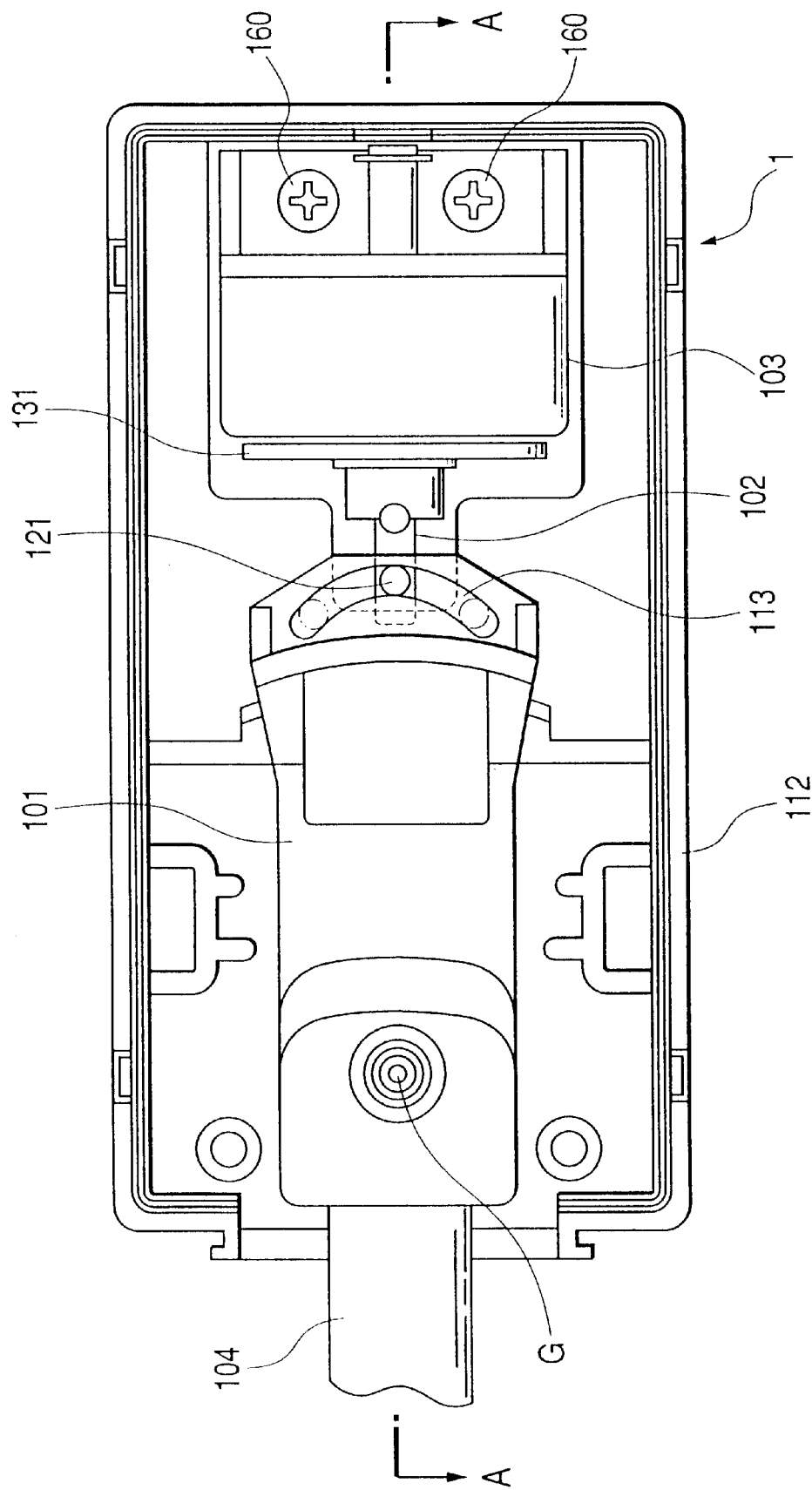
FIG. 3 is a plan view illustrating the canceling apparatus for a winker lever, which embodies the invention in the case that an upper cover is removed therefrom.
Figure 4:
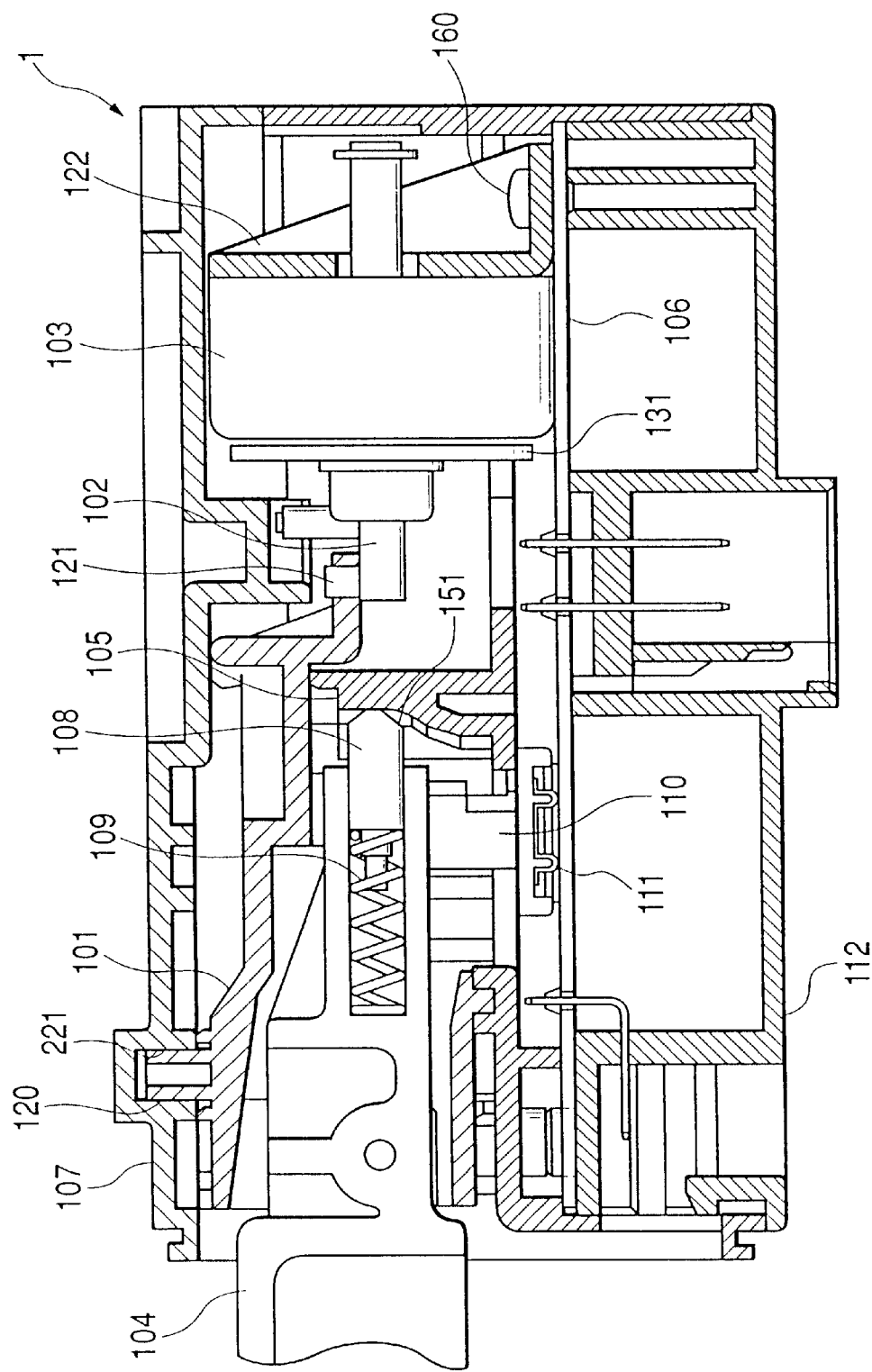
FIG. 4 is a sectional view taken on line A—A of FIG. 3, which illustrates the canceling apparatus for a winker lever in the case that an upper cover is attached thereto.

FIG. 3 is a plan view of the canceling apparatus for a winker lever according to the embodiment. Incidentally, for ready understanding the internal structure of this apparatus, this plan view illustrates a state in which an upper cover is removed from this apparatus. FIG. 4 is a sectional view taken on line A—A of FIG. 3, which illustrates the canceling apparatus for a winker lever in the case that the upper cover is attached thereto.

As illustrated in these figures, this canceling apparatus for a winker lever comprises a spindle portion 101, a guide pin 102, a solenoid 103, a winker lever 104, a housing 105, aboard 106, an upper cover 107, a moderation pin 108, a moderation spring 109, a contact slider 110, a moving contact 111, an under cover 112, and a bracket 122.

The upper cover 107 and the under cover 112 constitute an outer casing of this canceling apparatus for a winker lever. In this outer casing, the spindle portion 101 for accommodating the winker lever is turnably held through a rotation shaft 120 and a bearing portion 221.

Moreover, the solenoid 103 is provided in the outer casing and excited according to the rotation angle signal which is outputted from the angle sensor 5 and represents the steering angle of the steering 4, and serves to act on the winker lever 104 through the spindle portion 101 and to return the winker lever 104 to the neutral position.

A moderation pin 108 is elastically attached to an end portion of the winker lever 104 through the moderation spring 109. Moreover, a moderation ridge portion 151 is formed in such a way as to be integral with the outer casing. The moderation ridge portion 131 is adapted to be engaged with the moderation pin 108 to thereby hold the winker lever 104 in the neutral, left or right position. Furthermore, the apparatus has the moving contact 111 which is provided on the electric board 106 accommodated in the outer casing, and the contact slider 110 which interlocks with the winker lever 104 and slides while the slider 110 is in contact with the moving contact 111, as a position detecting portion in appended claims for detecting which of the neutral, left and right positions is a current position in which the winker lever 104 is held.

The contact slider 110 interlocks with the winker lever 104 and slides while the slider 110 is in contact with the moving contact 111 in this manner. Consequently, the position of the winker lever 104 is detected in response to the operation of the winker lever 104.

Furthermore, an arcuate guide groove 113 having a predetermined width is integrally formed in the spindle portion 101 as a guide portion in appended claims, which interlocks with the winker lever 104 and guides the winker lever 104 in such a manner as to move to the neutral, left and right positions.

Thus, the arcuate groove 113 has a predetermined width, engages with a projection portion 121 and enables the projection portion 121 to smoothly and reliably slide on the groove 113. The projection portion 121 interlocks with an operating plate 131 of the solenoid 103. The groove 113 interlocks with the winker lever 104. Thus, finally, a turn canceling operation of the winker lever 104 is reliably achieved.

Furthermore, the projection portion 121 for transmitting a driving force of the solenoid 103 and for acting upon the guide groove 113 thereby to control the position of the winker lever 104 is provided on the guide pin 102, which is fixed to the operating plate 131 of the solenoid 103. Additionally, the solenoid 103 is fixed to the board 106 through the bracket 122 by screws 160.

Figure 5:
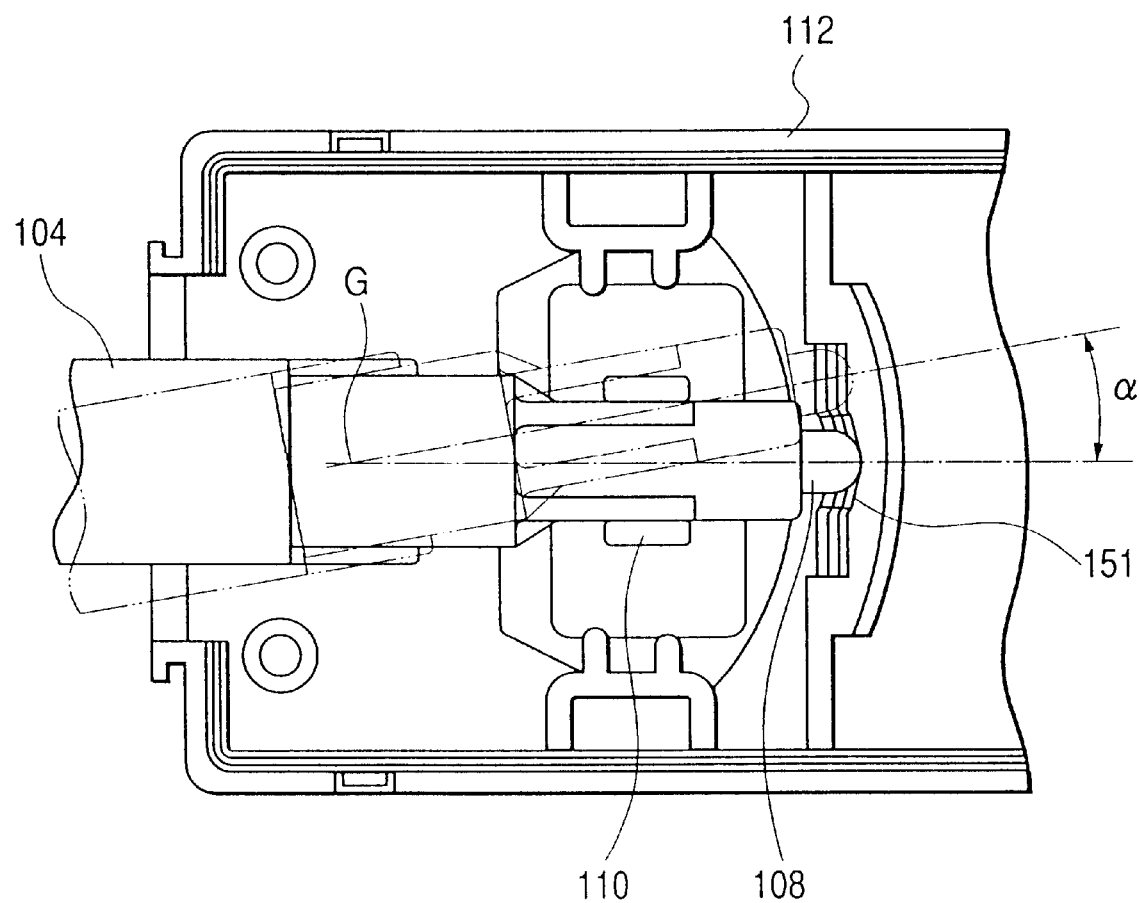
FIG. 5 is a view illustrating a part of each of the lever and the spindle portion, which are shown in FIG. 3, for describing an operation to be performed as the lever moves.
Figure 7A:
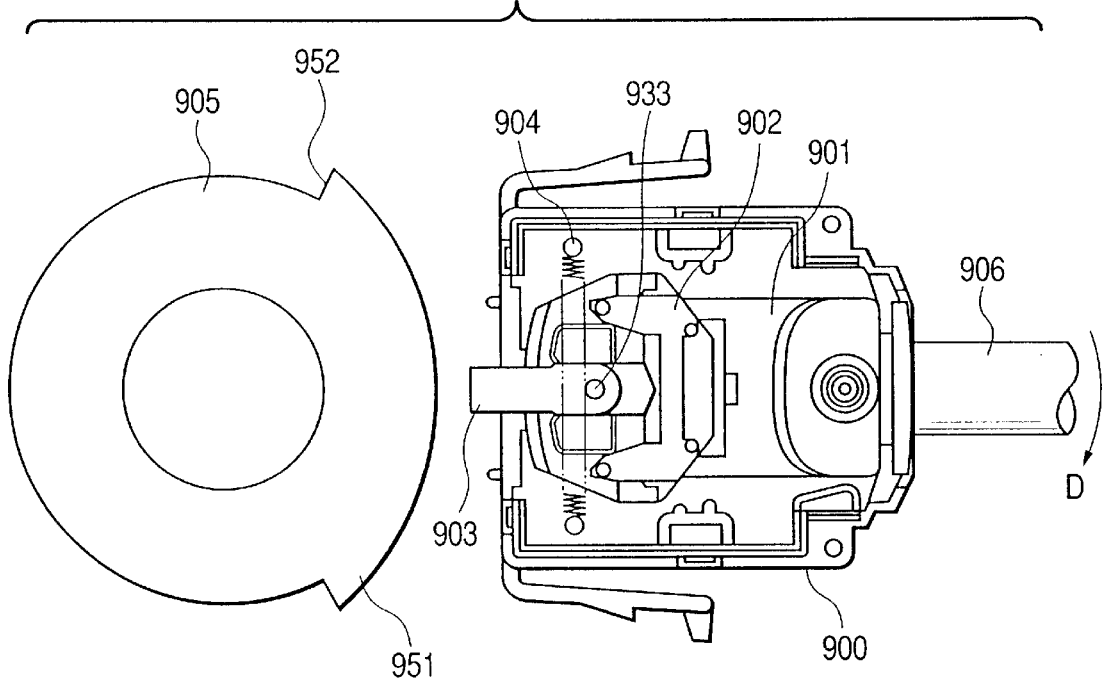
FIGS. 7A and 7B are views illustrating an operation of a conventional canceling apparatus for a winker lever.
Figure 7B:
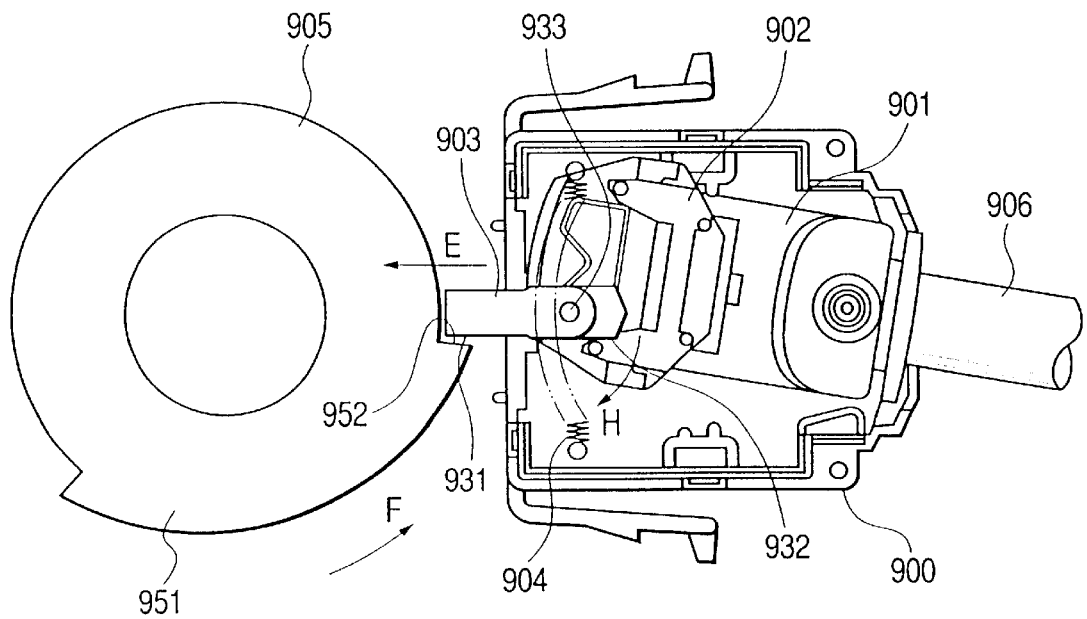
Figure 8A:
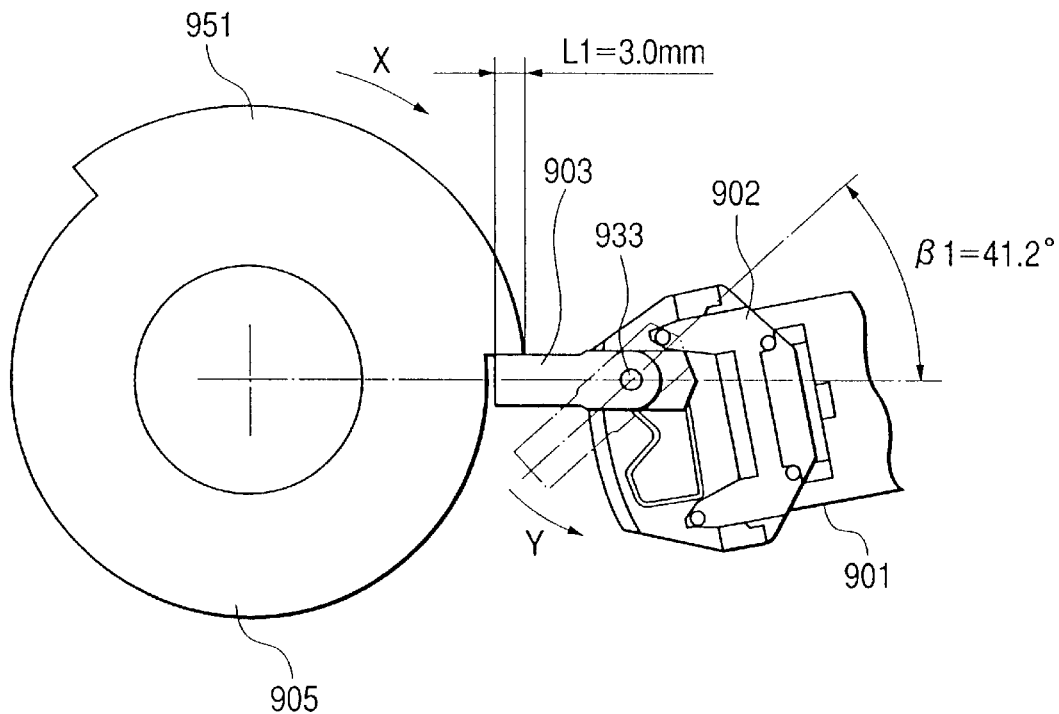
FIGS. 8A and 8B are views for comparing a normal condition operation of a related canceling apparatus for a winker lever with an abnormal condition operation thereof.
Figure 8B:
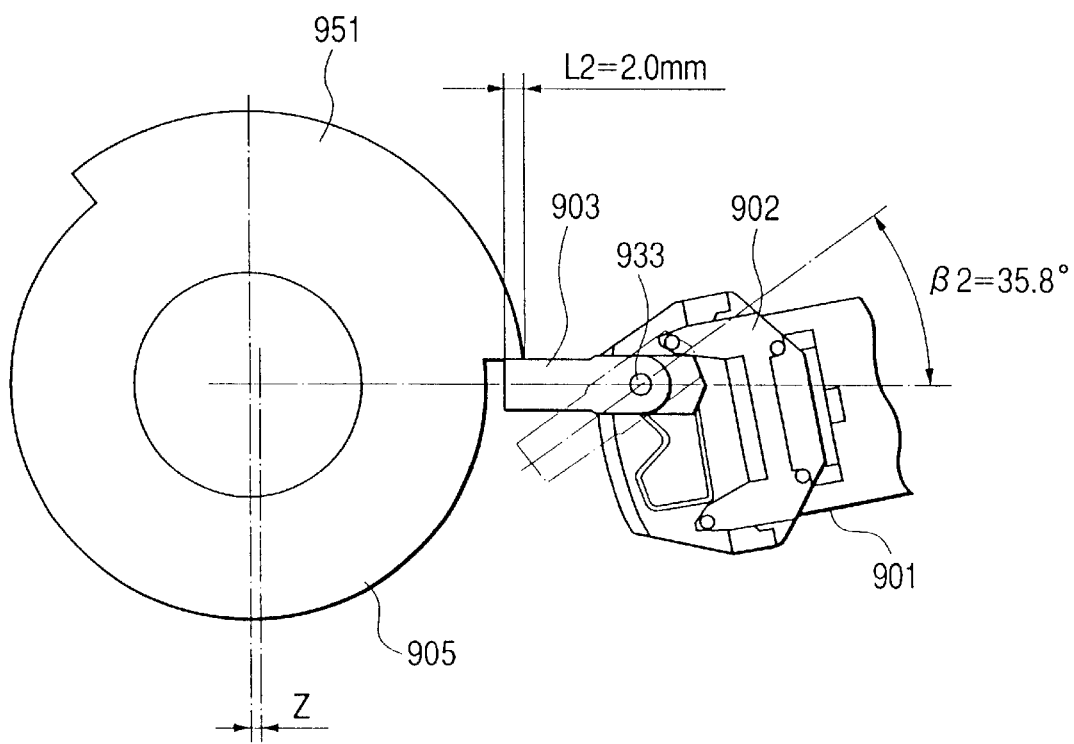

Further, an operation of the canceling apparatus for a winker lever according to the invention is described hereinafter. FIG. 5 is an explanation drawing illustrating a part of each of the lever and the spindle portion, which are shown in FIG. 3, for describing an operation to be performed as the lever moves. FIGS. 6A and 6B are explanation drawings illustrating operations performed between the spindle portion and the operating plate of the solenoid, which are shown in FIG. 3. FIG. 6A illustrates a neutral state (or turned-off state), and FIG. 6B illustrates a turned-on state.

When the lever 104 is operated so as to indicate the direction of turn of the automobile from the neutral position illustrated in FIG. 6A, that is, to indicate a right turn or a left turn, the spindle portion 101 turns by an angle $\alpha$. At this time, in the spindle portion 101, the lever 104 turns around an axis of rotation G by an angle $\alpha$. Then, the moderate pin 108 slides on the moderate ridge portion 151 of the housing 105 and is latched. Simultaneously with this, the contact slider 110, which holds the moving contact 111 shown in FIG. 4, moves. Then, a turn contact is put into a turned-on state. Subsequently, the right-turn indication signal or the left-turn indication signal is outputted to the control circuit 2.

Furthermore, at this time, the spindle portion 101 interlocks with the winker lever 4 and turns around the axis of rotation G by an angle $\alpha$, as illustrated in FIG. 6B. Moreover, at this time, the projection portion 121 of the guide pin 102 moves along the arcuate guide groove 113, which is provided in this spindle portion 101 and has a predetermined width, in the direction of an arrow C shown in this figure. The operating plate 131 of the solenoid 103 similarly moves as the projection portion 121 moves.

On the other hand, in the case that a turn canceling operation is performed, the solenoid driver 6 is driven by the control circuit 2 so as to return the winker lever to the neutral position when the steering 4 is turned counterclockwise (or clockwise) by an angle of 20 degrees after clockwise (or counterclockwise) turned more than an angle of 70 degrees, as described above with reference to FIG. 1. At this time, electric current is fed to the solenoid 103. The operating plate 131 of the solenoid 103 is attracted by an electromagnetic force thereof in the direction of an arrow B shown in FIG. 6A. Similarly, the projection portion 121 of the guide pin 102 moves in the direction of the arrow B as the operating plate 131 is attracted. Consequently, the spindle portion 101 is returned to the neutral state shown in FIG. 6A. Thus, the turn canceling operation of the winker lever is performed.

As described above, according to this embodiment, the position of the operated winker lever 104 is held by the moderation pin 108 and the moderation ridge portion 151. Further, the position where the winker lever 104 is held is detected by utilizing the contact slider 110 and the moving contact 111. Furthermore, the projection portion 121 and the guide groove 113 respectively interlocking with the operating plate 131 of the solenoid 103 and the winker lever 104 are engaged with each other. Thus, as the excited operating plate 131 moves, the winker lever 104 is returned to the neutral position.

The moderation pin 108, the moderation ridge portion 151, the contact slider 110, the moving contact 111, the projection portion 121, and the guide groove 113 are accommodated in the canceling apparatus for a winker lever. A canceling mechanism is completed in this apparatus. This eliminates the influence of external parts, such as the cancel cam, which affect the related canceling apparatus of the mechanical type for a winker lever. Therefore, there are no errors in performing a turn canceling operation of the winker lever. Furthermore, the external parts, such as the cancel cam, become unnecessary. Consequently, the number of constituent parts is reduced. Moreover, the reliability of the apparatus is enhanced.

As described above, according to the invention, the canceling mechanism is completed in this canceling apparatus for a winker. This eliminates the influence of external parts, such as the cancel cam, which affect the conventional canceling apparatus of the mechanical type for a winker lever. Therefore, there are no errors in performing a turn canceling operation of the winker lever 104. Furthermore, the external parts, such as the cancel cam, become unnecessary. Consequently, the number of constituent parts is reduced. Moreover, the reliability of the apparatus is enhanced.

Further, according to the invention, the position detection portion comprises the moving contact 111 and the contact slider 110. Thus, the contact slider 110 interlocks with the winker lever 104 and slides while the slider 110 is in contact with the moving contact 111. Thus, the position of the winker lever 104 is reliably detected in response to the operation of the winker lever 104.

Further, according to the invention, the guide portion is constituted by an arcuate groove 113 having a predetermined width. Thus, the projection portion 121 smoothly and reliably slides on this groove 113. The projection portion 121 interlocks with the operating plate 131 of the solenoid 103, while the groove 113 interlocks with the winker lever 104. Consequently, a turn canceling operation of the winker lever 104 is reliably achieved.

According to the fourth canceling apparatus of the invention, the angle sensor 5 detects the rotation angle by turning on or off the phototransistor. Thus, the angle sensor of a simple structure reliably detects the rotation angle. That is, basically, the angle sensor is simply constructed only by the photointerrupter 54 and the phototransistor. Moreover, there is no electrical contact between the disk 52 and the photointerrupter 54. Thus, an electrical contact failure due to electrical contact wear does not occur. Consequently, the rotation angle is reliably detected in a long term. Consequently, a turn canceling operation is stably performed.

What is claimed is:

1. A winker lever canceling apparatus comprising:
    an outer casing having an upper cover and an under cover;
    a winker lever turnably held in the outer casing;
    a solenoid for returning the winker lever to a neutral portion, which is excited according to a rotation angle signal outputted from an angle sensor and representing a steering angle of a steering and includes an operating plate;
    a moderation pin elastically provided on the winker lever through a moderation spring;
    a moderation ridge portion integrally formed in the outer casing and engaged with the moderation pin for holding the winker lever in one of neutral, left and right positions;
    a position detection portion formed in the outer casing for detecting the position where the winker lever is held;
    a projection portion which interlocks with the operating plate; and
    a guide portion engaged with the projection portion and provided so as to interlock with the winker lever to return the winker lever to the neutral position according to movement of the operating plate.

2. The winker lever canceling apparatus according to claim 1, wherein the position detection portion includes:
    a moving contact provided on an electric board accommodated in the outer casing; and
    a contact slider which interlocks with the winker lever and slides while being in contact with the moving contact.

3. The winker lever canceling apparatus according to claim 1, wherein the guide portion is constituted by an arcuate groove having a predetermined width.

4. The winker lever canceling apparatus according to claim 1, wherein
    the angle sensor includes a disk having slits and a photointerrupter, and phototransistor, and
    the slits and the photointerrupter interrupt light from beyond the dist to turn on or off the phototransistor and the angle sensor detects the rotation angle signal of the steering.

* * * * *